US012309331B2

(12) United States Patent
Sakai

(10) Patent No.: US 12,309,331 B2
(45) Date of Patent: May 20, 2025

(54) METHOD EXECUTING FUNCTION VIA SCANNER TO DISPLAY FIRST BUTTON CAUSING SCREEN TRANSITION TO SETTING SCREEN, SECOND AND THIRD BUTTONS CAUSING SCANNER TO PERFORM SCAN, NON-TRANSITORY COMPUTER-READABLE STORAGE MEDIUM STORING PROGRAM FOR DISPLAY FUNCTION

(71) Applicant: SEIKO EPSON CORPORATION, Tokyo (JP)

(72) Inventor: Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/475,330

(22) Filed: Sep. 27, 2023

(65) Prior Publication Data

US 2024/0114098 A1 Apr. 4, 2024

(30) Foreign Application Priority Data

Sep. 29, 2022 (JP) ................................ 2022-156437

(51) Int. Cl.
H04N 1/00 (2006.01)
(52) U.S. Cl.
CPC ..... H04N 1/00503 (2013.01); H04N 1/00424 (2013.01); H04N 1/00408 (2013.01)
(58) Field of Classification Search
None
See application file for complete search history.

(56) References Cited

U.S. PATENT DOCUMENTS

| 10,033,890 | B2 * | 7/2018 | Hanada | H04N 1/00474 |
| 11,184,497 | B2 * | 11/2021 | Tomii | H04N 1/0057 |
| 2004/0212842 | A1 * | 10/2004 | Miyamoto | H04N 1/00241 358/401 |
| 2007/0013562 | A1 * | 1/2007 | Nagasawa | H04N 1/32496 341/50 |
| 2012/0079411 | A1 * | 3/2012 | Tani | G03G 15/5087 715/773 |
| 2013/0070295 | A1 * | 3/2013 | Maruyama | H04N 1/00 358/1.15 |
| 2014/0002837 | A1 * | 1/2014 | Miyamoto | H04N 1/00822 358/1.13 |
| 2018/0027146 | A1 * | 1/2018 | Kato | H04N 1/00228 358/1.14 |
| 2018/0288272 | A1 * | 10/2018 | Yamamoto | H04N 1/00193 |
| 2021/0185185 | A1 * | 6/2021 | Takeo | H04N 1/00037 |
| 2022/0303400 | A1 * | 9/2022 | Kobana | H04N 1/0023 |
| 2023/0068836 | A1 * | 3/2023 | Kobana | H04N 1/00228 |

FOREIGN PATENT DOCUMENTS

JP 2021-097258 A 6/2021

* cited by examiner

Primary Examiner — Haris Sabah
(74) Attorney, Agent, or Firm — Global IP Counselors, LLP

(57) ABSTRACT

A scanner includes a display device 10 that displays a first button 61 that causes a screen transition to a setting screen for receiving a scan setting, a second button 62 that is located near the first button 61 and causes the scanner to immediately perform a scan according to a first setting, and a third button 63 that is located near the first button 61 and causes the scanner to immediately perform a scan according to a second setting.

7 Claims, 5 Drawing Sheets

METHOD EXECUTING FUNCTION VIA SCANNER TO DISPLAY FIRST BUTTON CAUSING SCREEN TRANSITION TO SETTING SCREEN, SECOND AND THIRD BUTTONS CAUSING SCANNER TO PERFORM SCAN, NON-TRANSITORY COMPUTER-READABLE STORAGE MEDIUM STORING PROGRAM FOR DISPLAY FUNCTION

The present application is based on, and claims priority from JP Application Serial Number 2022-156437, filed Sep. 29, 2022, the disclosure of which is hereby incorporated by reference herein in its entirety.

BACKGROUND

1. Technical Field

The present disclosure relates to a scanner, a storage medium, and a method.

2. Related Art

As is known in the art, an immediate execution button can immediately execute a function. For example, JP-A-2021-097258 discloses an immediate execution button that is displayed on a function display screen of, for example, a multifunction peripheral and immediately executes a job according to a selection or an instruction by a user.

An immediate execution button as disclosed in JP-A-2021-097258 is an easy way to execute a job according to a default setting. However, with the immediate execution button in the related art, it is difficult to execute a function corresponding to the immediate execution button according to a desired setting.

For example, when performing scanning, which is a function of a multifunction peripheral, by using an immediate execution button, it is difficult to set whether to use an automatic document feeding mechanism or a flatbed for the scanning.

SUMMARY

According to an aspect of the present disclosure, a scanner includes a display device that displays a first button that causes a screen transition to a setting screen for receiving a scan setting, a second button that is located near the first button and causes the scanner to immediately perform a scan according to a first setting, and a third button that is located near the first button and causes the scanner to immediately perform a scan according to a second setting.

According to another aspect of the present disclosure, a non-transitory computer-readable storage medium stores a program for causing a processor to implement a display function. The display function displays a first button that causes a screen transition to a setting screen for receiving a setting for a first function, a second button that is located near the first button and causes the processor to immediately perform the first function according to a first setting, and a third button that is located near the first button and causes the processor to immediately perform the first function according to a second setting.

A still another aspect of the present disclosure provides a method of executing a function according to operations received from a user via a first button, a second button, and a third button displayed on a screen. The method includes displaying a setting screen for making a setting for a first function in response to an operation of the first button by the user; immediately performing the first function according to a first setting in response to an operation of the second button by the user; and immediately performing the first function according to a second setting in response to an operation of the third button by the user.

DESCRIPTION OF EMBODIMENTS

Embodiments are described below with reference to the drawings.

First Embodiment

Figure 1:
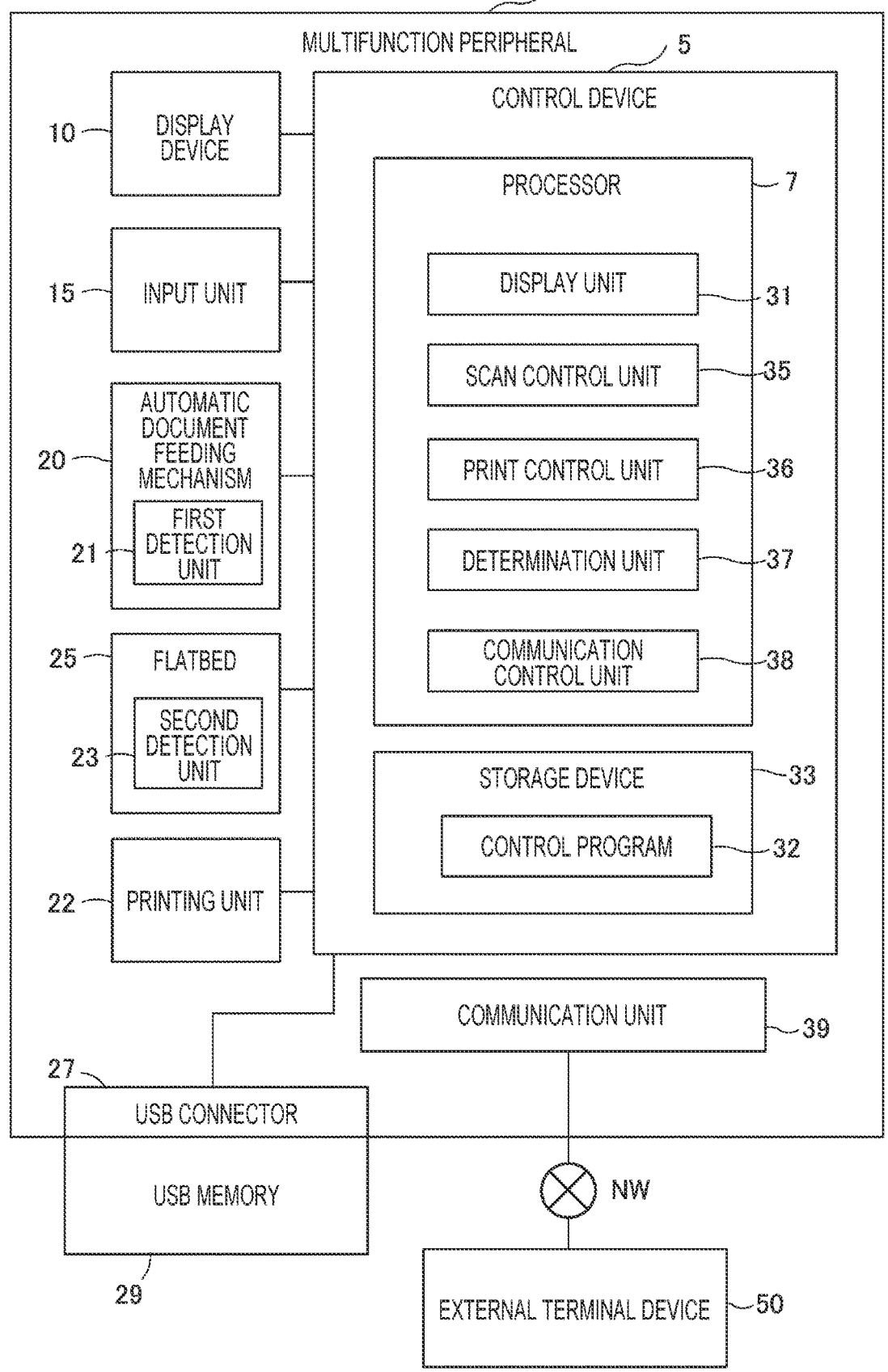
FIG. 1 is a block diagram illustrating a configuration of a multifunction peripheral.

FIG. 1 illustrates a configuration of a multifunction peripheral 1 according to a first embodiment.

The multifunction peripheral 1 is an example of a "scanner" and an "output device".

The multifunction peripheral 1, or an MFP, is a device including various functions such as a print function and a scan function. The multifunction peripheral 1 of the present embodiment includes a serial ink jet head and performs printing with the ink jet head.

The scan function is an example of a "first function".

The multifunction peripheral 1 includes a display device 10 that displays various types of information. The display device 10 is, for example, a liquid crystal display, a light emitting diode (LED) display, or an organic light emitting diode (OLED) display. The multifunction peripheral 1 includes an input unit 15. The input unit 15 is a touch sensor provided on the surface of the display device 10. A user inputs various types of information by operating a touch panel disposed to overlap the display device 10 based on the information displayed on the display device 10. The input unit 15 may instead be implemented by buttons and/or a mouse that is not provided on the surface of the display device 10.

The multifunction peripheral 1 includes an automatic document feeding mechanism 20, in other words, an automatic document feeder (ADF), that automatically feeds a document. The automatic document feeding mechanism 20 includes a first detection unit 21 that detects whether a document is placed in the automatic document feeding mechanism 20 and sends detection information to a control device 5 described later. The first detection unit 21 is a combination of an infrared sensor and an infrared light source and detects that a document is placed in the automatic document feeding mechanism 20 when infrared light is blocked by the document. The first detection unit 21 may be configured to detect that a document is placed in the automatic document feeding mechanism 20 by using any other technique.

The multifunction peripheral 1 includes a flatbed 25 that scans a document placed on the flatbed 25. The flatbed 25 may have any commonly-known device configuration and may be implemented by, for example, a combination of a light source and a detector that moves and captures image information of the entire document. For example, the flatbed 25 reads recorded characters and images by scanning a target object with light emitted by the light source and outputs image data obtained by the reading to the control device 5. The flatbed 25 includes a second detection unit 23 that detects whether a document is placed on the flatbed 25 and sends detection information to the control device 5 described later. The second detection unit 23 is a combination of an infrared sensor and an infrared light source, captures infrared light reflected by a document, and thereby detects that the document is placed on the flatbed 25. The second detection unit 23 may be configured to detect that a document is placed on the flatbed 25 by using any other technique.

The multifunction peripheral 1 reads an image of a document fed by the automatic document feeding mechanism 20 with a scanning mechanism provided in the flatbed 25.

The multifunction peripheral 1 includes a printing unit 22. The printing unit 22 is configured to print an image on a print medium using an existing technology such as an ink jet technology or an electrophotographic technology. For example, when an ink jet technology is employed, the printing unit 22 includes an ink jet head that ejects ink onto a print medium to form dots, a carriage that moves the ink jet head in a scanning direction, and a carriage drive motor that drives the carriage. The printing unit 22 also includes components related to printing such as a transport unit that transports a print medium and an ink supply unit that supplies ink to the ink jet head.

The display device 10, the input unit 15, the automatic document feeding mechanism 20, the flatbed 25, and the printing unit 22 are connected to the control device 5 and implement various functions by transmitting and receiving signals.

The multifunction peripheral 1 includes the control device 5 that controls the multifunction peripheral 1. The control device 5 includes a processor 7, such as a central processing unit (CPU), and a storage unit 33. The storage unit 33 is implemented by a storage device such as a random access memory (RAM) or a hard disk drive (HDD).

The processor 7 functions as a display unit 31, a scan control unit 35, a print control unit 36, a determination unit 37, and a communication control unit 38 by reading and executing a control program 32 stored in the storage unit 33.

The display unit 31 controls the display device 10 and causes the display device 10 to display information. The display unit 31 of the present embodiment causes the display device 10 to display an operation screen 60 described later.

The scan control unit 35 controls the automatic document feeding mechanism 20 and the flatbed 25 to cause the automatic document feeding mechanism 20 and the flatbed 25 to perform scanning. The scan control unit 35 performs data processing, such as RGB conversion and compression, on image data input from the flatbed 25 to generate scan data with a predetermined format.

The print control unit 36 controls the printing unit 22 to print information on a print medium.

The determination unit 37 determines whether a document is in the automatic document feeding mechanism 20 and whether a document is on the flatbed 25.

The communication control unit 38 communicates, via a communication unit 39 described later, with an external terminal device 50 connected to a network NW. Also, the communication control unit 38 communicates with a universal serial bus (USB) memory 29 via a USB connector 27 and sends scan data obtained by the multifunction peripheral 1 to the USB memory 29.

The control device 5 includes a communication unit 39. The communication unit 39 includes hardware, such as a communication circuit, and communicates with the external terminal device 50 via the network NW. The communication standard of the communication unit 39 may be either a wired communication standard or a wireless communication standard. The communication unit 39 sends scan data obtained by the multifunction peripheral 1 to the external terminal device 50.

As described above, the display device 10 displays the operation screen 60. The operation screen 60 is used to operate the multifunction peripheral 1.

The operation screen 60 is described below with reference to FIGS. 2 through 4.

Figure 2:
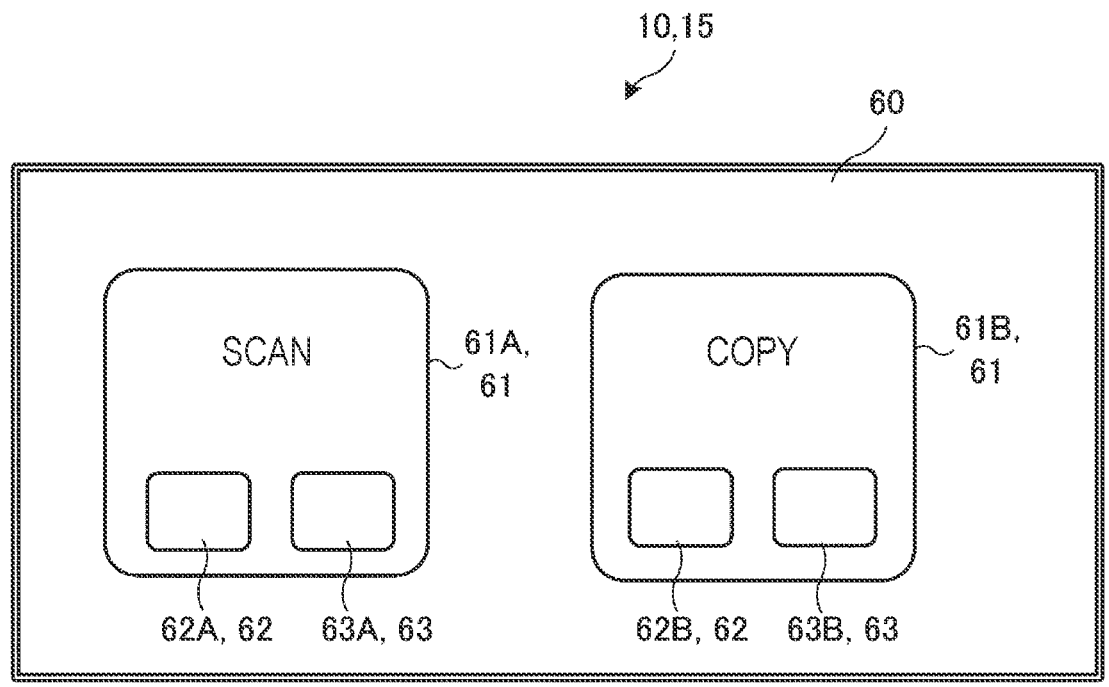
FIG. 2 is a diagram illustrating an example of an operation screen.
Figure 3:
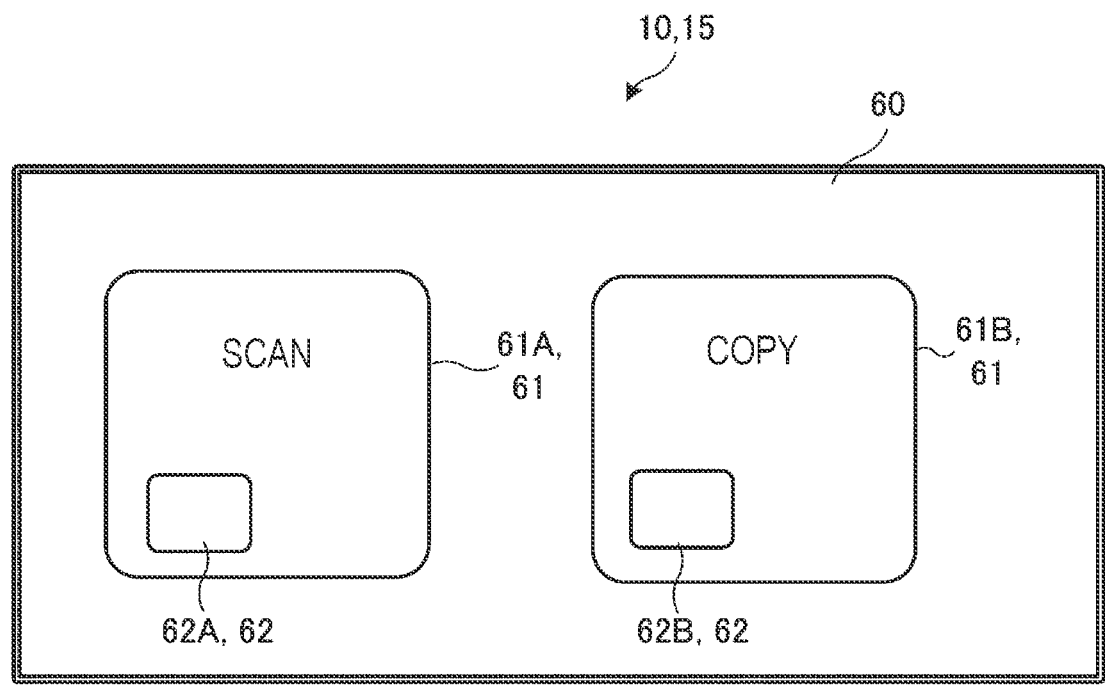
FIG. 3 is a diagram illustrating an example of an operation screen.
Figure 4:
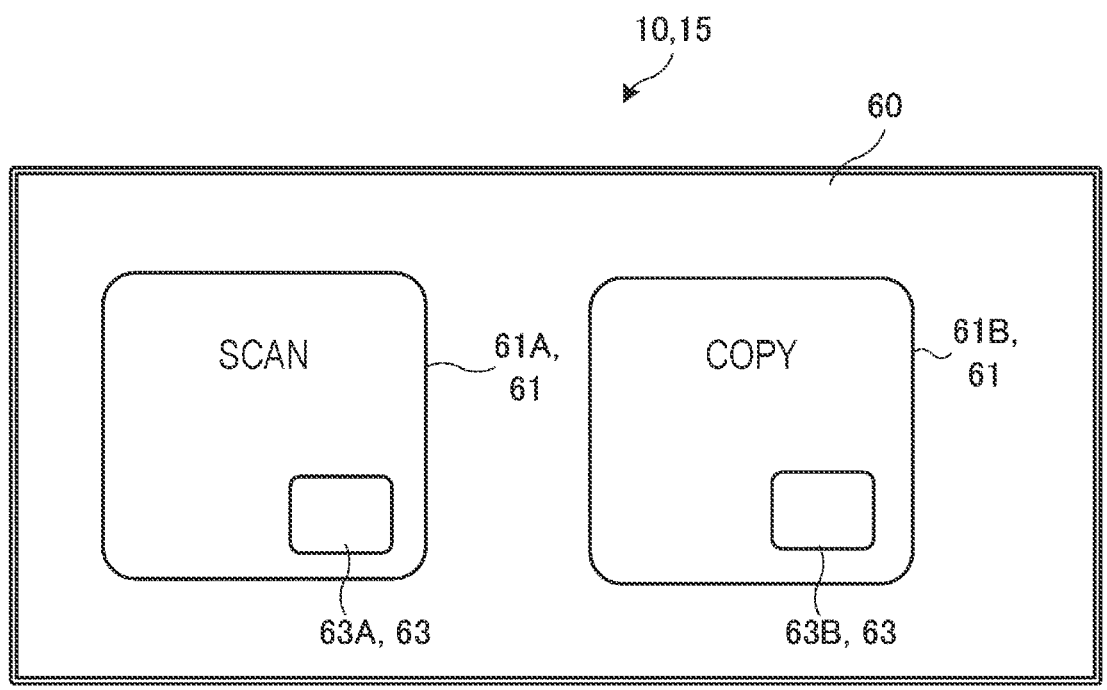
FIG. 4 is a diagram illustrating an example of an operation screen.

FIGS. 2 through 4 illustrate examples of the operation screen 60.

The operation screen 60 includes first buttons 61A and 61B. The first buttons 61A and 61B are software buttons. When it is not necessary to distinguish between the first buttons 61A and 61B, each of the first buttons 61A and 61B is referred to as a "first button 61".

The first button 61A is used to perform a scan. When the first button 61A is pressed, the display unit 35 displays a scan setting screen. The scan setting screen enables the user to set, for example, a setting specifying color or monochrome, a setting specifying a resolution, and a setting specifying whether the automatic document feeding mechanism 20 or the flatbed 25 is used. The scan setting screen includes a scan start button. When the scan start button is pressed, the scan control unit 35 performs a scan according to the settings specified on the scan setting screen.

The first button 61B is used to perform a scan and produce printed matter on which characters and/or images read by the scan are printed. That is, the first button 61B is used to produce a copy. The printed matter is an example of an "output". When the first button 61B is pressed, the display unit 35 displays a scan and print setting screen. The scan and print setting screen enables the user to set settings, such as a setting specifying color or monochrome, a setting specifying a resolution, and a setting specifying whether the automatic document feeding mechanism 20 or the flatbed 25 is used. The scan and print setting screen includes a copy start button. When the copy start button is pressed, the scan control unit 35 performs a scan according to the settings set on the scan and print setting screen. Then, the print control unit 36 produces printed matter by printing scanned characters and/or images on a print medium according to the settings set on the scan and print setting screen.

When a document is placed in the automatic document feeding mechanism 20, the operation screen 60 includes second buttons 62A and 62B. When it is not necessary to distinguish between the second buttons 62A and 62B, each of the second buttons 62A and 62B is referred to as a "second button 62".

The second button 62A is a software button. The second button 62A is displayed near the first button 61A. Here, displaying the second button 62A near the first button 61A indicates that the second button 62A is superimposed on the first button 61A or that the second button 62A is not superimposed on the first button 61A but is displayed closer to the first button 61A than to the first button 61B. In the present embodiment, it is assumed that the second button 62A is superimposed on the first button 61A. The second button 62A is an immediate execution button. That is, the second button 62A is used to immediately perform a scan using the automatic document feeding mechanism 20 without displaying the scan setting screen. When the second button 62A is pressed, the display unit 35 does not display the scan setting screen, and the scan control unit 35 immediately performs a scan using the automatic feeding mechanism 25. Settings, such as a scan resolution, are associated with the second button 62A in advance. In the present application, "immediately" performing a scan does not necessarily indicate that a document is scanned at the moment when the second button 62A is pressed. In the present application, performing a scan when the second button 62A is pressed without requiring any further action by the user is referred to as "immediately" performing a scan. For example, even when a warm-up is started after the second button 62A is pressed and a scan is started after the warm-up is completed, it can be said that the scan is "immediately" performed. Also, in the present application, performing a scan without displaying a setting screen may be referred to as "immediately" performing a scan.

The second button 62B is a software button. The second button 62B is displayed near the first button 61B. Here, displaying the second button 62B near the first button 61B has a meaning similar to displaying the second button 62A near the first button 61A. The second button 62B is an immediate execution button. That is, the second button 62B is used to immediately perform copying using the automatic document feeding mechanism 20 without displaying the scan and print setting screen. When the third button 62B is pressed, the display unit 35 does not display the scan and print setting screen, the scan control unit 35 performs a scan using the automatic feeding mechanism 25, and the print control unit 36 produces printed matter by printing scanned characters and/or images on a print medium. Settings, such as a scan resolution and a print resolution, are associated with the second button 62B in advance.

When a document is placed on the flatbed 25, the operation screen 60 includes third buttons 63A and 63B. When it is not necessary to distinguish between the third buttons 63A and 63B, each of the third buttons 63A and 63B is referred to as a "third button 63".

The third button 63A is a software button. The third button 63A is displayed near the first button 61A. The third button 63A is an immediate execution button. That is, the third button 63A is used to immediately perform a scan using the flatbed 25 without displaying the scan setting screen. When the third button 63A is pressed, the display unit 35 does not display the scan setting screen, and the scan control unit 35 performs a scan using the flatbed 25. Settings, such as a scan resolution, are associated with the third button 63A in advance.

The third button 63B is a software button. The third button 63B is displayed near the first button 61B. The third button 63B is an immediate execution button. That is, the third button 63B is used to immediately perform copying using the flatbed 25 without displaying the scan and print setting screen. When the third button 63B is pressed, the display unit 35 does not display the scan and print setting screen, the scan control unit 35 performs a scan using the flatbed 25, and the print control unit 36 produces printed matter by printing scanned characters and/or images on a print medium. Settings, such as a scan resolution and a print resolution, are associated with the second button 63B in advance.

FIG. 2 illustrates the operation screen 60 displayed when documents are placed in the automatic document feeding mechanism 20 and on the flatbed 25. FIG. 3 illustrates the operation screen 60 displayed when a document is placed in the automatic document feeding mechanism 20. FIG. 4 illustrates the operation screen 60 displayed when a document is placed on the flatbed 25. As illustrated in FIGS. 2 through 4, when a document is placed in the automatic document feeding mechanism 20, an immediate execution button for performing a scan according to a setting to use the automatic document feeding mechanism 20 is displayed. When no document is placed in the automatic document feeding mechanism 20, the immediate execution button for performing a scan according to the setting to use the automatic document feeding mechanism 20 is not displayed. When a document is placed on the flatbed 25, an immediate execution button for performing a scan according to a setting to use the flatbed 25 is displayed. When no document is placed on the flatbed 25, the immediate execution button for performing a scan according to the setting to use the flatbed 25 is not displayed. This configuration enables the user to immediately perform a scan according to a desired setting. When no document is placed in the automatic document feeding mechanism 20 and on the flatbed 25, no immediate execution button is displayed, and the first buttons 61A and 61B are displayed.

The setting to use the automatic document feeding mechanism 20 is an example of a "first setting". The setting to use the flatbed 25 is an example of a "second setting".

Figure 5:
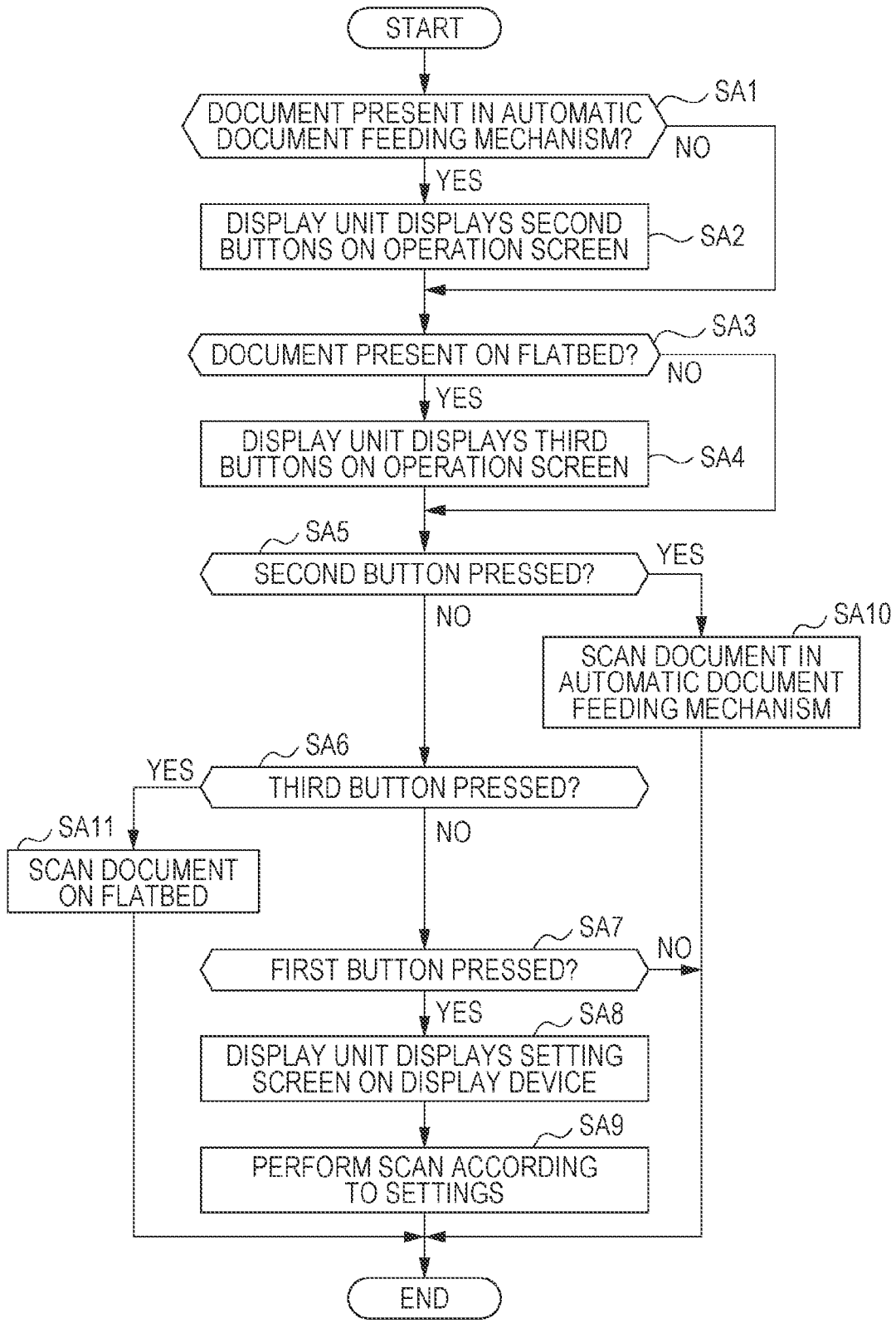
FIG. 5 is a flowchart illustrating an operation of a multifunction peripheral according to a first embodiment.

FIG. 5 is a flowchart illustrating an operation of the multifunction peripheral 1.

The determination unit 37 of the control device 5 determines whether a document is present in the automatic document feeding mechanism 20 based on detection information from the first detection unit 21 (step SA1). When it is determined that a document is present in the automatic document feeding mechanism 20 (step SA1: YES), the display unit 31 of the control device 5 displays the second buttons 62A and 62B on the operation screen 60 (step SA2).

On the other hand, when it is determined that no document is present in the automatic document feeding mechanism 20 (step SA1: NO), the determination unit 37 determines whether a document is present on the flatbed 25 based on detection information from the second detection unit 23 (step SA3). When it is determined that a document is present on the flatbed 25 (step SA3: YES), the display unit 31 displays the third buttons 63A and 63B on the operation screen 60 (step SA4).

On the other hand, when it is determined that no document is present on the flatbed 25 (step SA3: NO), the determination unit 37 determines whether a second button 62 (one of the second buttons 62A and 62B) has been pressed (step SA5). When it is determined that the second button 62 has not been pressed (step SA5: NO), the determination unit 37 determines whether a third button 63 (one of the third buttons 63A and 63B) has been pressed (step SA6). When it is determined that the third button 63 has not been pressed (step SA6: NO), the determination unit 37 determines whether a first button 61 (one of the first buttons 61A and 61B) has been pressed (step SA7). When it is determined that the first button 61 has been pressed, the display unit 31 of the control device 5 displays a setting screen on the display device 10 (step SA8). After receiving input information indicating settings, the scan control unit 35 performs a scan according to the settings (step SA9).

Referring back to step SA5, when it is determined that the second button 62 has been pressed (step SA5: YES), the scan control unit 35 scans the document placed in the automatic document feeding mechanism 20 (step SA10). Here, when the second button 62B is pressed, printed matter, on which characters and/or images scanned at step SA10 are printed, is produced.

Referring back to step SA6, when it is determined that the third button 63 has been pressed (step SA6: YES), the scan control unit 35 scans a document on the flatbed 25 (step SA11). Here, when the third button 63B is pressed, printed matter, on which characters and/or images scanned at step SA11 are printed, is produced.

Referring back to step SA7, when it is determined that the first button 61 has not been pressed (step SA7: NO), the processor 7 ends the process.

Second Embodiment

In the first embodiment described above, the "first setting" specifies a scan using the automatic document feeding mechanism 20, and the "second setting" specifies a scan using the flatbed 25.

In a second embodiment, the "first setting" specifies that scan data is to be stored in an external memory, and the "second setting" specifies that scan data is to be sent to the external terminal device 50. The "second setting" may also specify that scan data is to be sent to, for example, a desired e-mail address. Examples of the external terminal device 50 include a personal computer, mobile information terminals such as a tablet terminal and a smart phone, and a server. The external memory is not limited to the USB memory 29 but may also be an external storage device such as a hard disk drive (HDD) or a solid state device (SSD).

Descriptions of components of the multifunction peripheral 1 of the second embodiment similar to the components of the multifunction peripheral 1 of the first embodiment are omitted. The operation screen 60 of the second embodiment includes the first button 61A, the second button 62A, and the third button 63A described in the first embodiment. Because the first button 61A, the second button 62A, and the third button 63A are similar to those of the first embodiment, these buttons are described by also using FIG. 2.

In the present embodiment, the first button 61A in FIG. 2 is used to perform a scan and send scan data obtained by the scan. When the first button 61A is pressed, the display unit 35 displays a scan setting screen. The scan setting screen enables the user to set a setting to store scan data in an external memory such as a USB memory and a setting to send scan data to the external terminal device 50. Also, the scan setting screen enables the user to select one of a PDF format, a JPEG format, and a TIFF format as a setting for outputting image information. The scan setting screen includes a scan start button. When the scan start button is pressed, the scan control unit 35 performs a scan and sends scan data according to settings specified on the scan setting screen.

In the present embodiment, it is assumed that the USB memory 29 connected to the USB connector 27 is used as an external memory.

When the USB memory 29 is connected to the USB connector 27, the operation screen 60 includes the second button 62A.

In the present embodiment, the second button 62A in FIG. 2 is used to immediately perform a scan and send scan data to the USB memory 29 for storage without displaying a scan and transmission setting screen.

When the external terminal device 50 is connected to the multifunction peripheral 1, the operation screen 60 includes the third button 63A.

In the present embodiment, the third button 63A in FIG. 2 is used to immediately perform a scan and send scan data to the external terminal device 50 without displaying the scan and transmission setting screen.

Figure 6:
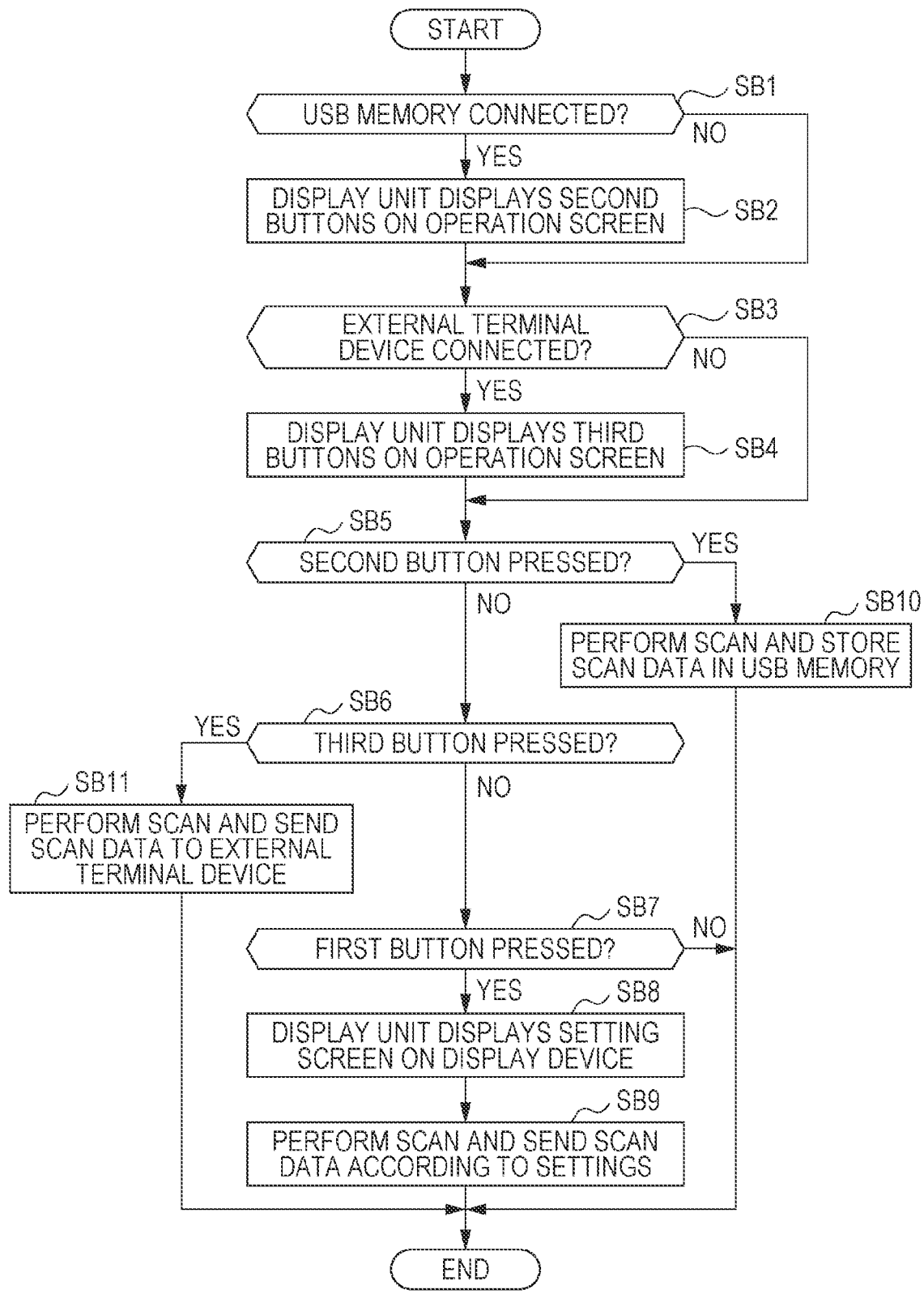
FIG. 6 is a flowchart illustrating an operation of a multifunction peripheral according to a second embodiment.

FIG. 6 is a flowchart illustrating an operation of the multifunction peripheral 1 according to the second embodiment.

The determination unit 37 of the control device 5 determines whether the USB memory 29 is connected based on detection information from the USB connector 27 (step SB1). When it is determined that the USB memory 29 is connected to the USB connector 27 (step SB1: YES), the display unit 31 of the control device 5 displays the second button 62A on the operation screen 60 (step SB2).

On the other hand, when it is determined that the USB memory 29 is not connected to the USB connector 27 (step SB1: NO), the determination unit 37 determines whether the external terminal device 50 is connected to the multifunction peripheral 1 according to an existing method (step SB3). When it is determined that the external terminal device 50 is connected to the multifunction peripheral 1 (step SB3: YES), the display unit 31 displays the third button 63A on the operation screen 60 (step SB4).

On the other hand, when it is determined that the external terminal device 50 is not connected to the multifunction peripheral 1 (step SB3: NO), the determination unit 37 determines whether the second button 62A has been pressed (step SB5). When it is determined that the second button 62A has not been pressed (step SB5: NO), the determination unit 37 determines whether the third button 63A has been pressed (step SB6). When it is determined that the third button 63A has not been pressed (step SB6: NO), the determination unit 37 determines whether the first button 61A has been pressed (step SB7). When it is determined that the first button 61A has been pressed, the display unit 31 of the control device 5 displays a setting screen on the display device 10 (step SB8). After receiving input information indicating settings, the scan control unit 35 and the communication control unit 38 perform a scan and transmission according to the settings (step SB9).

Referring back to step SB5, when it is determined that the second button 62A has been pressed (step SB5: YES), the scan control unit 35 performs a scan and the communication control unit 38 stores scan data in the USB memory 29 (step SB10).

Referring back to step SB6, when it is determined that the third button 63A has been pressed (step SB6: YES), the scan control unit 35 performs a scan and the communication control unit 38 sends scan data to the external terminal device 50 (step SB11).

Referring back to step SB7, when it is determined that the first button 61A has not been pressed (step SB7: NO), the processor 7 ends the process.

As described above, the multifunction peripheral 1 includes the display device 10 configured to display the first button 61 that causes a screen transition to a setting screen for receiving a scan setting, the second button 62 that is located near the first button 61 and for immediately performing a scan according to a first setting, and the third button 63 that is located near the first button 61 and for immediately performing a scan according to a second setting.

This configuration makes it possible to display immediate execution buttons with different scan settings and thereby makes it possible to immediately perform a scan according to a desired setting.

The first setting specifies a scan using the automatic document feeding mechanism 20. The second setting specifies a scan using the flatbed 25.

This enables the user to select one of a setting to use the automatic document feeding mechanism 20 for scanning and a setting to use the flatbed 25 for scanning. This in turn makes it possible to immediately perform a scan according to a desired setting.

The display device 10 displays the second button 62 when a document is set in the automatic document feeding mechanism 20 and does not display the second button 62 when no document is set in the automatic document feeding mechanism 20.

This improves the usability for the user because a button to immediately perform a scan using the automatic document feeding mechanism 20 is displayed only when a document is set in the automatic document feeding mechanism 20.

The display device 10 displays the third button 67 when a document is set on the flatbed 25 and does not display the third button 67 when no document is set on the flatbed 25.

This improves the usability for the user because a button to immediately perform a scan using the flatbed 25 is displayed only when a document is set on the flatbed 25.

The first setting specifies that scan data is to be output to the USB memory 29 that is connected. The second setting specifies that scan data is to be output to the external terminal device 50 connected to the network NW.

This enables the user to select one of a setting to store scan data in the USB memory 29 and a setting to send scan data to the external terminal device 50 connected to the network NW. This in turn makes it possible to immediately perform a scan according to a desired setting.

The control program 32 causes the processor 7 to implement a display function for displaying the first button 61 that causes a screen transition to a setting screen for receiving a scan setting. Also, the control program 32 causes the processor 7 to implement a display function for displaying the second button 62 that is located near the first button 61 and causes the processor 7 to perform a scan according to the first setting and the third button 63 that is located near the first button 61 and causes the processor 7 to perform a scan according to the second setting.

This provides effects similar to the effects provided by the multifunction peripheral 1 described above.

In a printed matter production method, the first button 61, the second button 62, and the third button 63 are displayed; the multifunction peripheral 1 displays a setting screen for making a setting for a scan when a user operates the first button 61; the multifunction peripheral 1 performs a scan according to a first setting and produces printed matter when the user operates the second button 62; and the multifunction peripheral 1 performs a scan according to a second setting and produces printed matter when the user operates the third button 63.

This method provides effects similar to the effects provided by the multifunction peripheral 1 described above. Also, this method makes it possible to immediately produce printed matter according to a desired setting.

The present disclosure is not limited to the above described embodiments, and various modifications may be made to the embodiments without departing from the spirit of the present disclosure.

The processes of the control device 5 illustrated in the flowcharts of FIGS. 5 and 6 are divided into process units according to the types of the processes to facilitate the understanding of the processes. However, the present disclosure is not limited by how the processes are divided and by the names of the process units. Depending on the type of process, the process illustrated in FIG. 5 may be further divided into smaller process units or may be divided such that each process unit includes a greater number of operations. Also, the orders of process units in the processes are not limited to the examples illustrated in the flowcharts.

In the embodiments described above, the multifunction peripheral 1 is used as an example of a "scanner" or an "output device". However, the "scanner" may be configured to not include a print function. Also, the "output device" may be a printing device not including a scan function. Furthermore, outputs are not limited to scan data and printed matter but may also be other types of outputs.

In the embodiments described above, the scan function is used as an example of the "first function". However, the first function is not limited to the scan function and may include or may be a function different from the scan function.

Also, in the embodiments described above, it is assumed that information is displayed on a display of the multifunction peripheral 1. However, the present disclosure is not limited to this example. As other examples, information may be displayed on a display device different from the multifunction peripheral 1 or may be displayed on a screen by using a projector.

The "first setting" and the "second setting" are not limited to those described above. For example, the "first setting" may specify a color image scanning, and the "second setting" may specify a monochrome image scanning. Also, for example, when the "first function" is a print function, the "first setting" and the "second setting" may specify color printing and monochrome printing, respectively. Also, for example, the "first setting" and the "second setting" may specify data formats of scan data to be transmitted. Examples of data formats include a PDF format, a JPEG format, and a TIFF format. The "first setting" and the "second setting" may be freely set by an administrator on a setting screen in advance. An immediate execution button is not limited to a button that is displayed when the corresponding function can be executed according to a setting assigned to the button and is hidden when the function cannot be executed according to the setting. Alternatively, an immediate execution button may be continuously displayed with a different appearance, e.g., a grayed-out appearance, even when the corresponding function cannot be executed, or may be continuously displayed with the same appearance even when the corresponding function cannot be executed and configured to output an error in response to an operation.

Also, graphical user interfaces (GUI) are not limited to those described above. Only one first button may be displayed, or three or more first buttons may be displayed. Also, three or more immediate execution buttons may be displayed for each first button. Furthermore, it is obviously possible to display buttons other than those described above.

The multifunction peripheral 1 may include multiple processors 7 configured to perform parallel processing.

What is claimed is:

1. A scanner comprising:
   a display device that displays
      a first button that causes a screen transition to a setting screen on which a user inputs a scan setting, the first button having an outline that defines an outer periphery of the first button, a second button that is located within the outer periphery of the first button such that an outline of the second button is surrounded by the outline of the first button with a space therebetween, the second button causing the scanner to immediately perform a scan according to a first setting, a third button that is located within the outer periphery of the first button such that an outline of the third button is surrounded by the outline of the first button with a space therebetween, the third button causing the scanner to immediately perform a scan according to a second setting, and a fourth button that is other than the first button, the second button and the third button and is located outside the outer periphery of the first button such that an outline of the fourth button is spaced from the outline of the first button, a distance from a center of the first button to a center of the second button being shorter than a distance from the center of the first button to a center of the fourth button, and a distance from the center of the first button to a center of the third button being shorter than the distance from the center of the first button to the center of the fourth button.

2. The scanner according to claim 1, wherein
the first setting specifies a scan using an automatic document feeding mechanism; and
the second setting specifies a scan using a flatbed.

3. The scanner according to claim 1, wherein
the first setting specifies that scan data is to be output to an external memory connected to the scanner; and
the second setting specifies that the scan data is to be output to an external terminal device connected to a network.

4. A scanner comprising:
a display device that displays
   a first button that causes a screen transition to a setting screen on which a user inputs a scan setting,
   a second button that is located near the first button and causes the scanner to immediately perform a scan according to a first setting, and
   a third button that is located near the first button and causes the scanner to immediately perform a scan according to a second setting, wherein
the first setting specifies a scan using an automatic document feeding mechanism,
the second setting specifies a scan using a flatbed, and
the display device
   displays the second button when a document is set in the automatic document feeding mechanism, and
   does not display the second button when no document is set in the automatic document feeding mechanism.

5. A scanner comprising:
a display device that displays
   a first button that causes a screen transition to a setting screen on which a user inputs a scan setting,
   a second button that is located near the first button and causes the scanner to immediately perform a scan according to a first setting, and
   a third button that is located near the first button and causes the scanner to immediately perform a scan according to a second setting, wherein
the first setting specifies a scan using an automatic document feeding mechanism,
the second setting specifies a scan using a flatbed, and
the display device
   displays the third button when a document is set on the flatbed, and
   does not display the third button when no document is set on the flatbed.

6. A scanner comprising:
a display device that displays
   a first button that causes a screen transition to a setting screen on which a user inputs a scan setting,
   a second button that is located near the first button and causes the scanner to immediately perform a scan according to a first setting, and
   a third button that is located near the first button and causes the scanner to immediately perform a scan according to a second setting, wherein
the first setting specifies that scan data is to be output to an external memory connected to the scanner,
the second setting specifies that the scan data is to be output to an external terminal device connected to a network, and
the display device
   displays the second button when the external memory is connected, and
   does not display the second button when the external memory is not connected.

7. A scanner comprising:
a display device that displays
   a first button that causes a screen transition to a setting screen on which a user inputs a scan setting,
   a second button that is located near the first button and causes the scanner to immediately perform a scan according to a first setting, and
   a third button that is located near the first button and causes the scanner to immediately perform a scan according to a second setting, wherein
the first setting specifies that scan data is to be output to an external memory connected to the scanner,
the second setting specifies that the scan data is to be output to an external terminal device connected to a network, and
the display device
   displays the third button when the external terminal device is connected to the network, and
   does not display the third button when the external terminal device is not connected to the network.

* * * * *